United States Patent [19]
Daoud

[11] Patent Number: 6,104,806
[45] Date of Patent: Aug. 15, 2000

[54] MODULAR LAYERED NETWORK INTERFACE UNIT HAVING IMPROVED CABLE DRESSING CAPABILITIES

[75] Inventor: Bassel Hage Daoud, Parsippany, N.J.

[73] Assignee: Lucent Technologies, Inc., Murray Hill, N.J.

[21] Appl. No.: 09/143,315

[22] Filed: Aug. 28, 1998

[51] Int. Cl.[7] ........................................... H04M 1/00
[52] U.S. Cl. ................................................. 379/399
[58] Field of Search ................... 379/399, 325, 379/326, 327, 328, 442; 361/356

[56] References Cited

U.S. PATENT DOCUMENTS

4,949,376  8/1990  Nieves et al. ............................ 379/399
5,363,440  11/1994  Daoud ..................................... 379/399

*Primary Examiner*—Jack Chiang
*Attorney, Agent, or Firm*—Howard C. Miskin; Gloria Tsui-Yip

[57] ABSTRACT

A network interface unit is disclosed having a plurality of modular layers mountable on each other in a consecutive manner with each layer being hinged and having at least one passageway for passing wires to and from the modular layers.

13 Claims, 6 Drawing Sheets

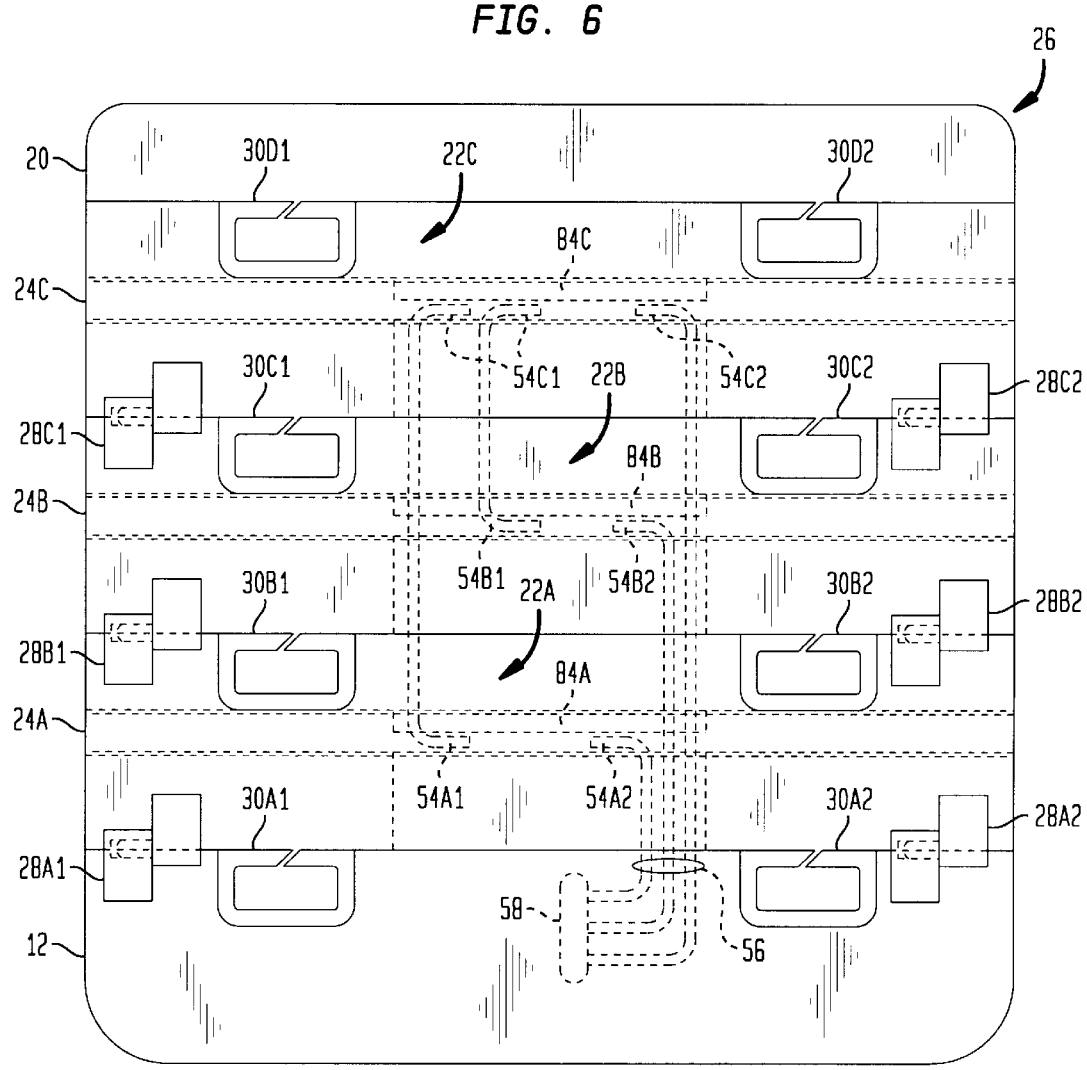

MODULAR LAYERED NETWORK INTERFACE UNIT HAVING IMPROVED CABLE DRESSING CAPABILITIES

CROSS REFERENCE TO RELATED APPLICATION

This application is related to U.S. patent application Ser. No. 08/143,313, and is assigned to the same assignee as the present invention.

BACKGROUND OF THE INVENTION

This invention relates to telecommunications apparatus and, in particular, to network interface units and building entrance protector units having capabilities to facilitate cable dressing.

Network interface units are known in the art and one such unit is disclosed in U.S. Pat. No. 5,363,440 ('440) of Daoud, and which is herein incorporated by reference. As discussed in the '440 patent, network interface units constitute the demarcation between the customer's equipment and the telephone network. In buildings including multiple subscribers, the network interface unit is typically mounted in a basement and includes an array of customer bridges, each bridge being coupled to an individual subscriber line. The bridges are typically coupled to the phone network through an RJ11 jack and plug so that the customer can plug a working phone into the jack to determine if any problems lie in the customer or network side of the telecommunications system.

Network interface units typically also include a building entrance protector portion which comprises a cable splice chamber and a protector field device for providing surge protection for each customer. Depending on the size or type of the components; e.g., fiber optics, wireless telephone, or coaxial equipment, to be mounted in a network interface unit to accommodate the needs of the customers in the building, the dimensions of the network interface unit may need to be adjusted, requiring various sized housing for different types of components, leading to various sized housings which, in turn, lead to different sized network interface units. A network interface unit that meets their various needs using a single designed modular layer, along with modular building blocks techniques, is disclosed in the cross-referenced U.S. patent application Ser. No. 09/143,313 having Attorney Docket Daud 117. The use of multiple modular layers create cabling complications between the multiple modular layers and it is desirable to provide cabling techniques and devices thereof that free the modular layer network interface unit from these cabling complications.

SUMMARY OF THE INVENTION

The invention in one aspect is a network interface unit for servicing a multiplicity of subscribers.

The network interface unit has a base portion and a cover portion and, in one embodiment, comprises a bottom portion mounted on the base portion and including a splice chamber and an array of protector devices mounted thereon. The splice chamber includes wiring for connecting a cable to the protectors. The network interface unit further comprises a plurality of modular layers, a plurality of stacked trays, a plurality of hinges, and with the plurality of modular layers and trays each having first and last members thereof. Each modular layer includes at least an array of customer bridges each adapted for coupling to a different line of a subscriber with each modular layer having a passageway. Each array has cabled wiring to electrically connect to respective protective devices mounted in the bottom portion with the cabled wiring passing through the passageway. The plurality of stacked trays each having first and second sides and each tray holds a respective modular layer. Each tray has its first side proximate to the respective passageway. The plurality of hinges has first and second ends for interconnecting the plurality of trays and with each hinge having one of its ends attached to the first side of the tray proximate the passageway. The plurality of hinges has first and last hinges with the first hinge being joined between the first tray and the base portion and the last hinge being joined between the last tray and the cover.

BRIEF DESCRIPTION OF THE DRAWINGS

These and other features of the invention are delineated in detail in the following description. In the drawings:

FIG. 6 is a view of the hinged side of the network interface unit illustrating, in phantom, the interconnecting cable runs between the modular layers and between the modular layers and protective unit for one embodiment.

It will be appreciated that, for purposes of illustration, these figures are not necessarily drawn to scale.

DETAILED DESCRIPTION OF THE PREFERRED EMBODIMENTS

Figure 1:
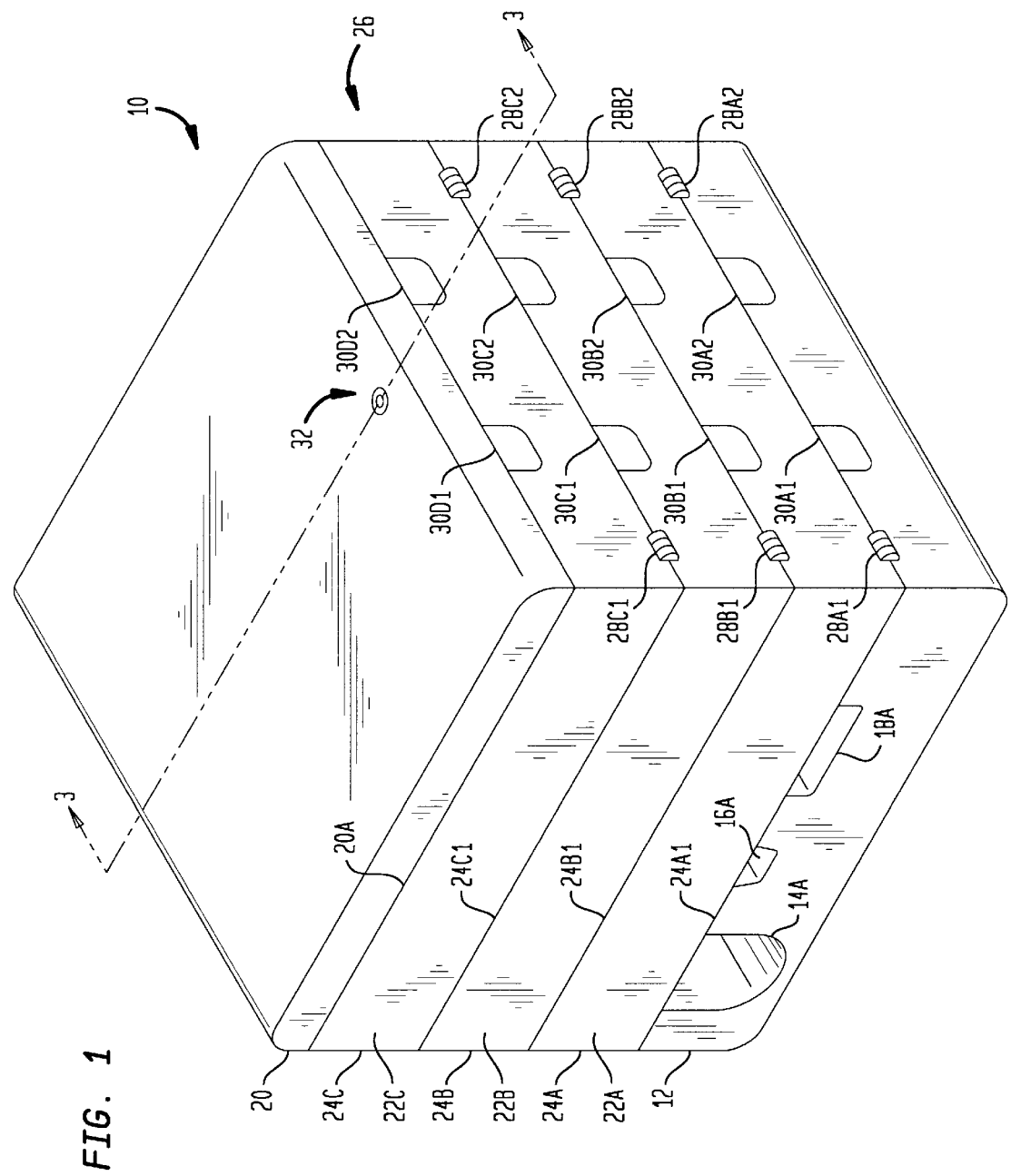
FIG. 1 is a front perspective view of a network interface unit in accordance with an embodiment of the invention and illustrated to show the first or hinged side of the network interface unit.

FIG. 1 illustrates primarily the network interface unit 10 in accordance with the invention. The network interface unit 10 embodies a building-block technique and is comprised of modular layers and sets of hinges. Each modular layer has a passageway that facilitates the interconnecting cabling between modular layers. The modular layers allow for the mounting of panels or electrical devices thereon and the panels allow for mounting of other components, such as telephone and fiber optic equipment. One of the opposite sides of the network interface unit preferably includes a security mechanism, such as screws and screw receptacles, so that the modular layers can be opened separately or together as a set thereof.

The network interface unit 10 of FIG. 1, has a base portion 12 having openings 14A, 16A and 18A all providing passageways for the entrance and/or exit of cabling. The network interface unit 10 further has a cover portion 20 having a lower edge portion 20A.

The network interface unit 10 further comprises a plurality of modular layers 22A, 22B, and 22C, each of which is respectively mounted in trays 24A, 24B, 24C, which have lower edge portions 24A1, 24B1 and 24C1 respectively. The modular layers 22A, 22B and 22C preferably respectively cooperate with trays 24A, 24B and 24C, but if desired, one or more layers 22A, 22B and 22C may be arranged to cooperate with tray 24A, tray 24B or tray 24C or any combination thereof. The modular layers 22A, 22B and 22C may be of any number and are preferably stacked upon each other in a consecutive manner. Similarly, the trays 24A, 24B, and 24C, may be of any number. The plurality of modular layers 22A . . . 22C has a first and last modular layer, such as 22A and 22C respectively. Similarly, the plurality of stacked trays 24A . . . 24C has a first and a last tray, such as 24A and 24C respectively. The modular layers 22A . . . 22C and trays 24A . . . 24C may be arranged using a building-block technique so as to provide a network interface unit 10 that has various dimensions to accommodate the various needs of customers and telecommunication systems.

The network interface unit 10 is illustrated in FIG. 1 so as to expose the hinge side 26 of the network interface unit 10. As used herein, the hinge side 26 of the network interface device 10, and the hinge side of modular layers 22A . . . 22C, the trays 24A . . . 24C, and the cover 20 may be interchangeably referred to as the first side. The network interface unit 10 has a plurality of hinges 28A1–28A2, 28B1–28B2, 28C1–28C2 that respectively operatively cooperate with trays 24A, 24B, and 24C and are located on the first side of trays 24A, 24B and 24C that is proximate to passageways of the modular layers 22A, 22B and 22C and are to be more fully described hereinafter with reference to FIGS. 5 and 6.

The network interface unit 10 further comprises a plurality of openings or windows 30A1–30A2, 30B1–30B2, 30C1–30C2 that are used to more advantageously dress the cabling associated with modular layers 22A, 22B, and 22C. The windows 30A1 . . . 30C2, as well as other windows of the network interface unit 10, also provide the means for ingress or egress of cabling associated with the network interface unit 10. The network interface unit 10 further comprises openings or windows 30D1–30D2 that may be used to dress the cabling associated with the last or upper modular layer 22C. The cover 20 further includes a screw and screw receptacle arrangement 32 dimensioned for complementary mating therebetween and that may be used to connect/disconnect the cover 20 to the last tray 24C. The network interface unit 10 further comprises a locking side 34 which is more clearly illustrated in FIG. 2.

Figure 2:
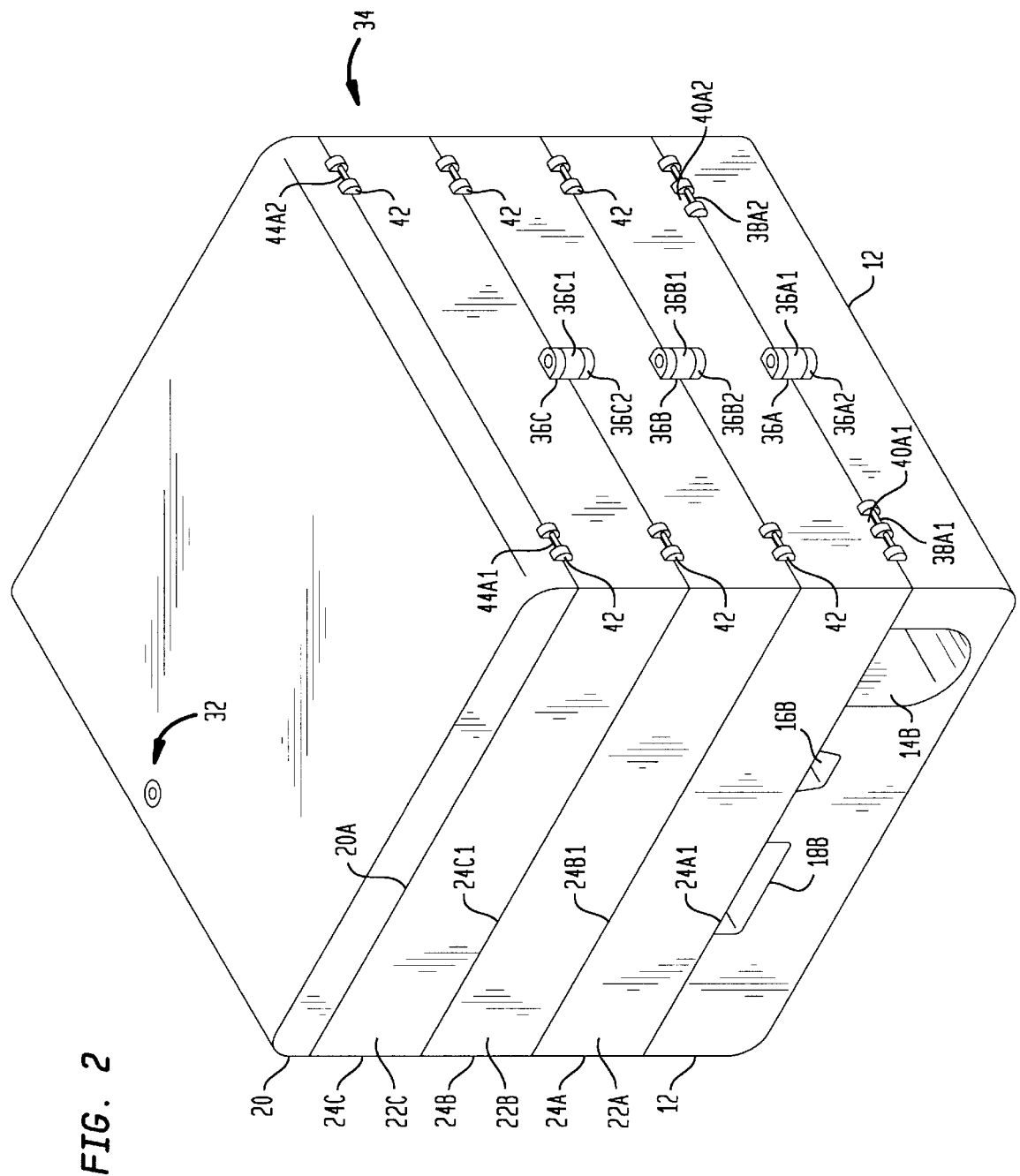
FIG. 2 is a rear perspective view and illustrated to show the second or locking side of the network interface unit.

As used herein, the locking side 34 of the network interface device 10, and the locking side of the modular layers 22A . . . 22C, the trays 24A . . . 24C, and the cover 20 may be interchangeably referred to herein as the second side. The network interface unit 10 further comprises a plurality of sets of screws and screw receptacles 36A, 36B, and 36C respectively serving as locking devices and comprised of upper and lower portions 36A1–36A2, 36B1–36B2, and 36C1–36C2. The upper and lower portions 36A1 . . . 36C2 are dimensioned for complementary mating therebetween. As seen in FIG. 2, the set 36A is attached between the base 12 and to the first tray 24A. The set 36B is attached between the first tray 24A and the second tray 24B. The third set 36C is attached between the next to the last tray 24B and the last tray 24C.

The base 12 further comprises hinged arrangements 38A1 and 38A2 into which respectively extend lips 40A1 and 40A2 which are extensions of a splice chamber to be further described with reference to FIG. 4. Further, the network interface unit 10 comprises a plurality of hinges 42 which is interconnected to trays 24A, 24B, and 24C, but with only the hinges 42 of tray 24C being actively used and having lip portions 44A1 and 44A2 of the cover 20 extending therein so that the cover 20 may be hingedly rotated about the last tray 24C. The mating of lip portions 44A1 and 44A2 to the hinges 42 of tray 24C, as well as the mating of lips 40A1 and 40A2 to hinges 38A1 and 38A2 respectively, may be accomplished in a manner known in the art so as to provide proper hinging therebetween. The internal components making up the network interface unit 10 may be further described with reference to FIG. 3 which is a view taken along line 3—3 of FIG. 1.

Figure 3:
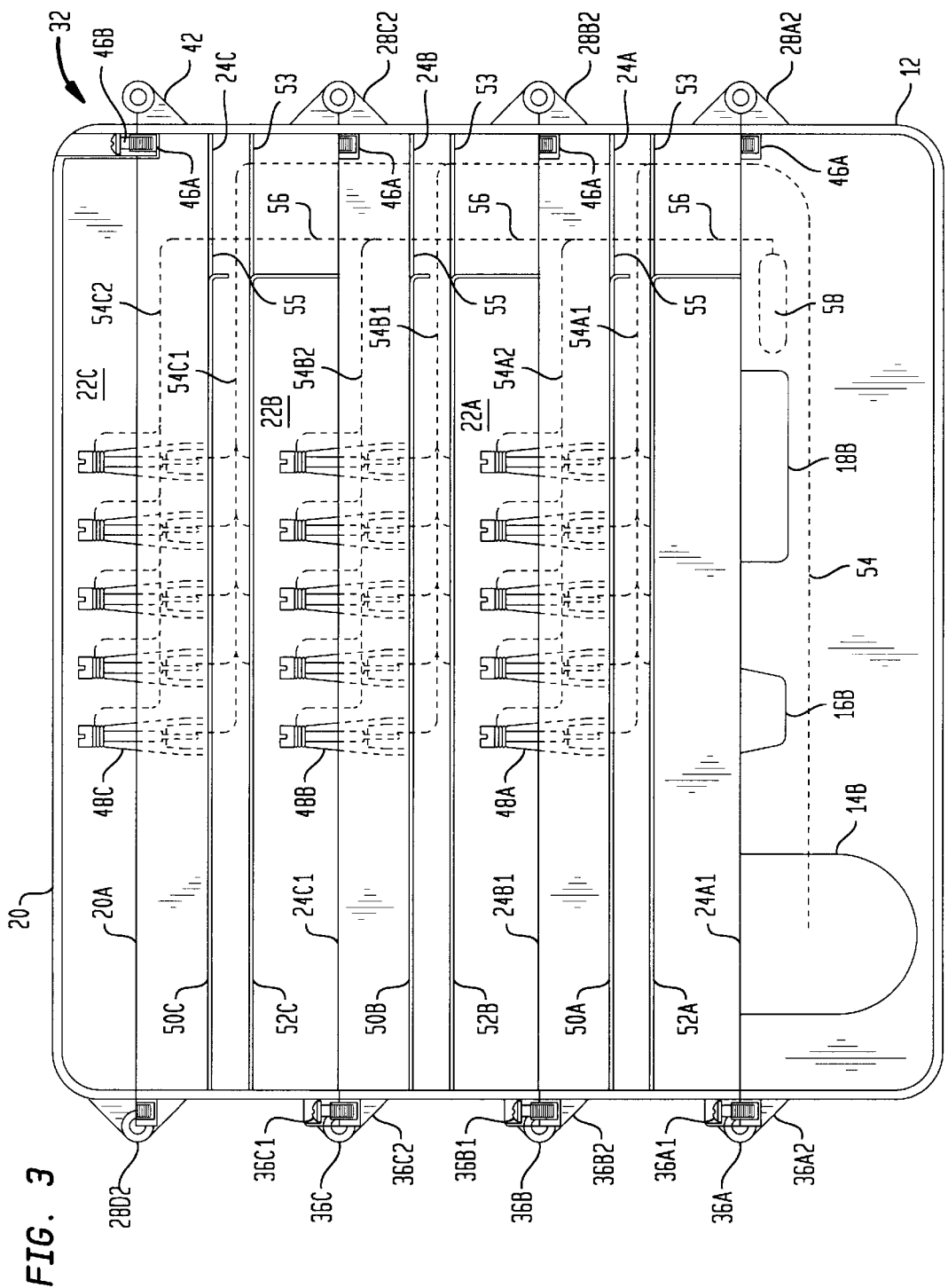
FIG. 3 is a view of the network interface unit taken along line 3—3 of FIG. 1.

FIG. 3 illustrates a screw receptacle 46A and a screw 46B, both part of the screw arrangement 32 of cover 20, and both of which are dimensioned for complementary mating therebetween and with screw receptacle being located in the tray 24C and screw 46B thereof being attached to cover 20. Further, FIG. 3 illustrates the first tray 24A, the second tray 24B, and the base 12, each having an unused receptacle 46A.

The modular layers 22A, 22B, and 22C, respectively are shown as being lodged in trays 24A, 24B and 24C, and include customer bridges 48A, 48B and 48C respectively, which are more fully described in the previously mentioned U.S. Pat. No. 5,363,440.

The modular layers 22A, 22B, and 22C further include electrical devices 50A–52A, 50B–52B and 50C–52C respectively. These electrical devices 50A–52A, 50B–52B, 50C–52C are preferably panels that allow for the mounting of electronic components, such as those components found in telephone and fiber optic equipment. More particularly, the panels 50A . . . 52C may serve as motherboards for the mounting of the data-processing devices.

FIG. 3 further shows cabled wiring for the network interface device 10 comprising cable runs 54 and 56. The cable run 54 represents the wiring to and from the network interface unit 10 and is segmented into cable runs 54A1, 54B1, and 54C1 that respectively supply the cabling to and from devices 48A–50A–52A; 48B–50B–52B; and 48C–50C and 52C. The cable run 56 is comprised of the cabling 54A2, 54B2 and 54C2 that respectively comprise the wiring from the customer bridges 48A, 48B and 48C that are all interconnected to connector 58 which interconnects the customer bridges 48A, 48B and 48C to a protective unit 60 which may be further described with reference to FIG. 4.

Figure 4:
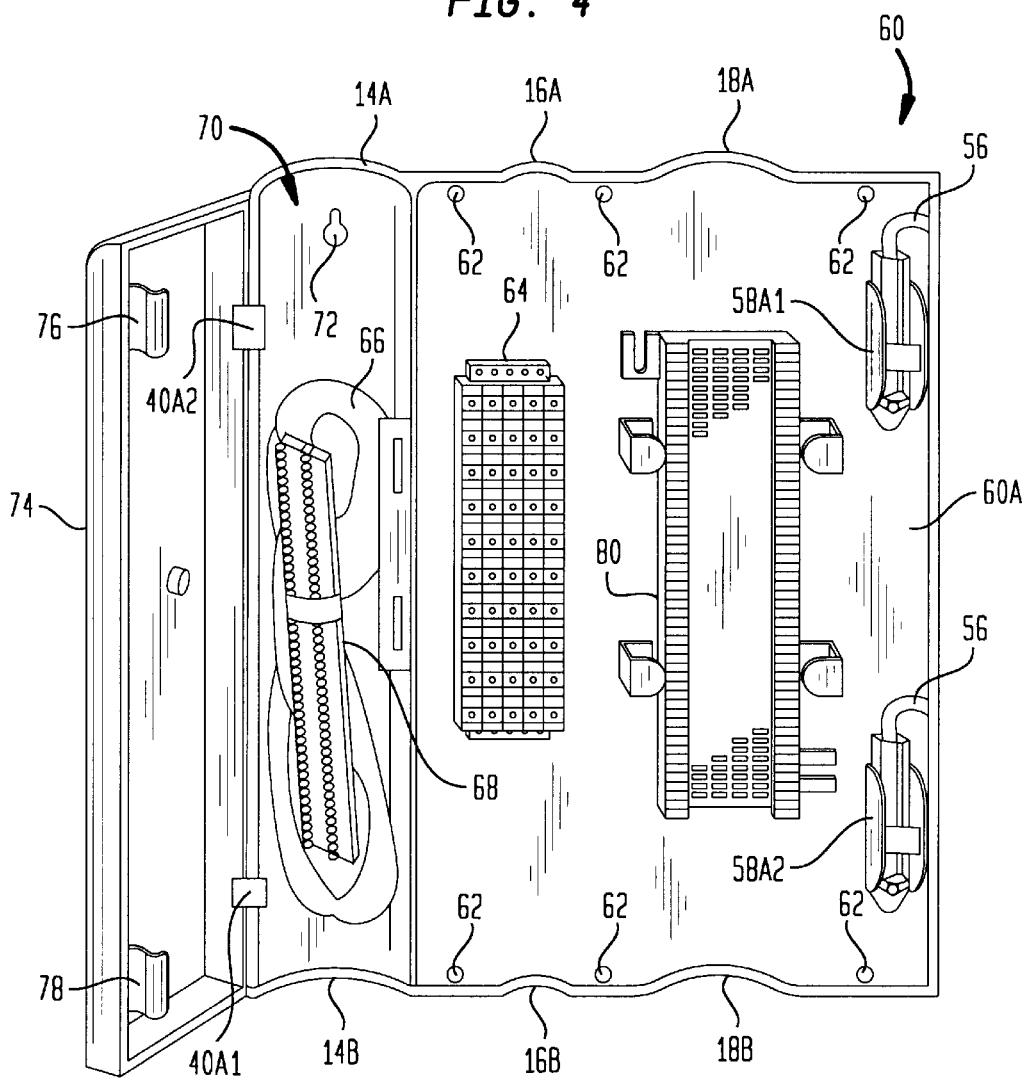
FIG. 4 is a front perspective view of the protector unit in accordance with one embodiment of the present invention.

FIG. 4 illustrates a building entrance protector unit 60, applicable to one embodiment of the present invention, having the cable run 56 interconnected thereto by means of connector 58 which is comprised of separate connectors 58A1 and 58A2 both being conventional types. The protector unit 60 is situated onto base 12 of the network interface unit 10 having the openings 14A, 16A and 18A of FIG. 1 which are respectively arranged in a complementary manner, relative to openings 14B, 16B and 18B of the network interface unit 10. The protector unit 60 is mounted to a frame member 60A by way of fasteners 62, or other equivalent means. The protector unit 60 includes an array 64 of protective devices with each protector device of array 64 being typically a solid state surge arrester which is plugged into a socket (not shown) mounted to the protective unit 60, in particular, the frame member 60A of the protector unit 60. The array 64 of protectors is electrically coupled to a bundle of wires 66 which terminate in a splice connector 68.

The splice connector 68, known in the art, provides the capabilities for connecting a cable to the protective array 64. The splice connector 68 and the major portion of the wire bundle 66 are situated within a splice chamber 70. The chamber 70 includes the openings 14A and 14B serving as cable passageways, whereas the other openings or cable passageways 16A, 16B, 18A and 18B are located under the protective unit 60. The back wall of the splice chamber 70 includes a hole 72 which permits wall mounting of the network interface unit 10. A cover 74 is mounted by means of clip members 76 and 78 and hinges 40A1 and 40A2 (previously described with reference to FIG. 2) to the splice chamber 70 to protect the splices formed therein.

Also mounted on the protective unit 60 is a cross-connect or tapping field device 80. Such field device 80, which are standard in the art, includes an array of connectors, each coupled between a protector and an associated customer bridge by way of cable run 56. By applying jumper cables (not shown) to the connectors, connections can be changed between protectors and customer bridges when, for example, a customer changes his or her location in the building.

The network interface unit 10 has fold-out positions of its modular layers and cable runs that accommodate the fold-out positions in a manner as more fully described in the cross-referenced U.S. Patent application Ser. No. 09/143,313, having Attorney Docket No. Daoud 117.

The network interface unit 10 has passageways for accommodating the need of cabling for interconnecting between and amongst the modular layers 22A, 22B and 22C and may be further described with reference to FIG. 5.

Figure 5:
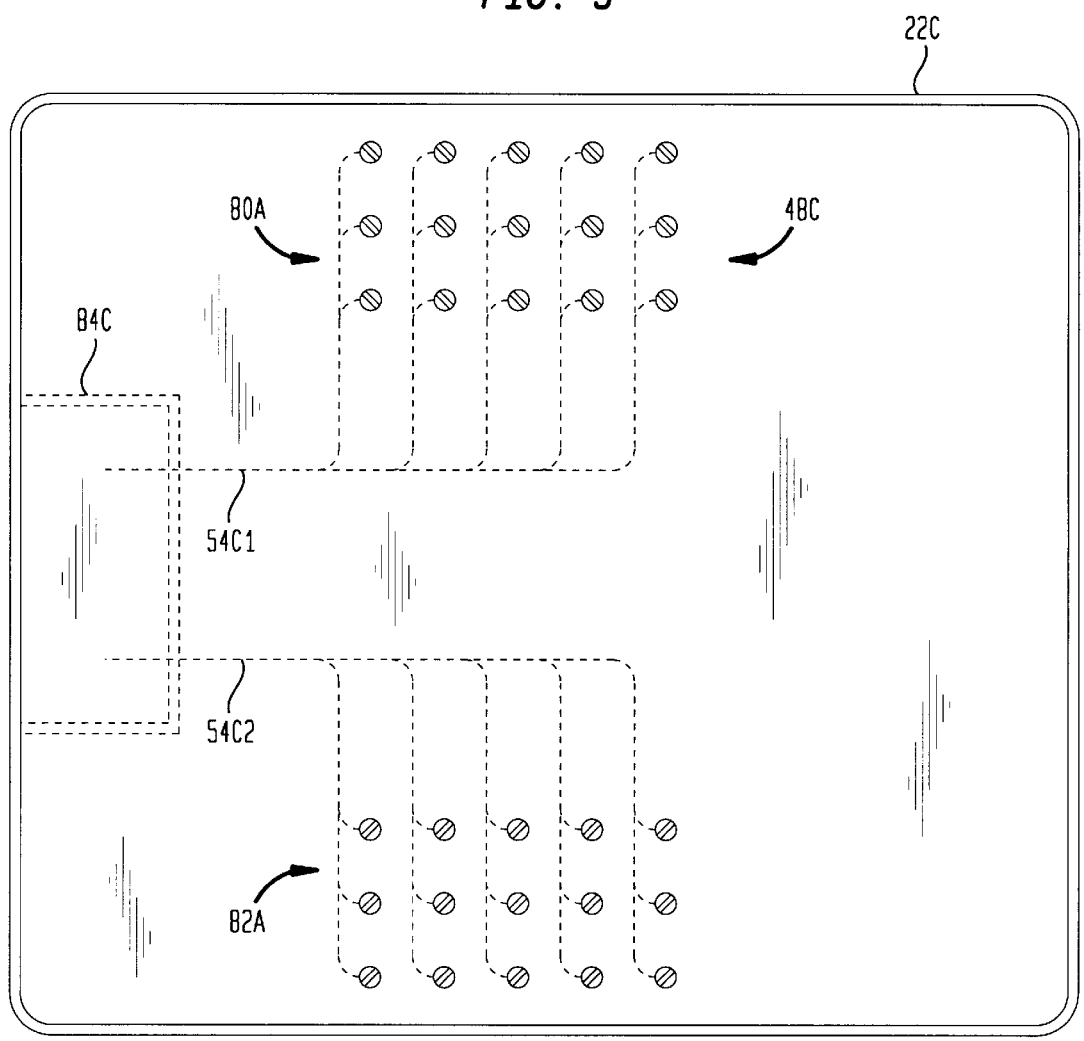
FIG. 5 is a top view of the modular layer illustrating the passageway therein.

FIG. 5 is a top view of the modular layers 22A, 22B and 22C but carries the reference nomenclature for modular layer 22C although the description to be given with reference to FIG. 5, as well as FIG. 3, is equally applicable to modular layers 22B and 22A.

FIG. 5, for illustrative purposes, shows the customer bridge 48C as comprising segments 80A and 82A separated from each other and on opposite sides of and substantially occupying modular layer 22C, wherein in actuality the modular layer 22C also includes the panels 50C and 52C shown in FIG. 3. Further, FIG. 5 further illustrates the segment 80A as being associated with only cable run 54C1, previously described with reference to FIG. 3, and segment 82A associated with cable run 54C2, previously described with reference to FIG. 3, wherein in actuality the segments 80A and 82A may share cable runs 54C1 and 54C2. The cable runs 54C1 and 54C2 may lie on top of modular layer 22C or run under the modular layer 22C. Both of the cable runs 54C1 and 54C2 pass through the passageway 84C of the modular layer 22C. The passageway 84C is dimensioned to be large enough so that a technician or landlord may extend his hand through the opening to work on wiring. This is beneficial considering that prior art connections have wires bundled together not meant for the landlord to work on.

The cable runs 54C1 and 54C2 interconnect the modular layer 22C to the other modular layers 22B and 22A and to the protective unit 60 of FIG. 4, respectively, may be further described with reference to FIG. 6 which illustrates the hinge side 26 of the network interface unit 10 previously described with reference to FIG. 1.

FIG. 6 illustrates the cable run 54C1 running under the modular layer 22C as passing through the passageway 84B of modular layer 24B and then passing through and under the passageway 84A of modular layer 24A for connection (not shown) thereto. FIG. 6 also illustrates a cable run 54C1 as running under modular layer 22C and passing through passageway 84B of modular layer 22B and then identified as cable run 54B1.

FIG. 6 further illustrates the cable run 54C2 running under modular layer 22C and passing through passageways 84B and 84A of modular layers 22B and 22A respectively and then becoming part of cable run 56 (previously described with reference to FIG. 3) which connects into connector 58 (previously described with reference to FIG. 4) for connection, for one embodiment, to the protective unit 60.

FIG. 6 also illustrates cable run 54B2 running under modular layer 22B as passing through passageway 84A of modular layer 22A and then also becoming part of the cable run 56. Finally, FIG. 6 illustrates the cable run 54A2 running under modular layer 22A and then also becoming part of the cable run 56.

It should now be appreciated that the present invention provides a network interface unit 10 having passageways that not only allow for cable runs to be easily run and dressed, but eases the complications of providing interconnections between and amongst the modular layers and also between the modular layers and the protective unit housed in the base of the network interface unit 10.

Although the previous description referred separately to modular layers 22A . . . 22C and to trays 24A . . . 24C, if desired these elements may be merged into one unit so long as the function of each modular layer 22A . . . 22C and each tray 24A . . . 24C is provided in accordance with the teaching of the present invention.

Various additional modifications will become apparent to those skilled in the art. All such variations which basically rely on the teachings to which the invention has advanced the art are properly considered within the scope of this invention.

What I claim is:

1. A network interface unit having a base portion having mounted therein a bottom portion including a splice chamber and an array of protector devices mounted thereon, said splice chamber including wiring means for connecting a cable to said protectors, said network interface unit further having a cover portion and servicing a multiplicity of subscribers, said unit comprising:

a plurality of modular layers having first and last modular layers thereof and each modular layer including at least an array of customer bridges each adapted for coupling to a different line of a subscriber, each modular layer having a passageway and each array having cabled wiring to electrically couple to respective protective devices mounted in said bottom portion with said cabled wiring passing through said passageway;

a plurality of contiguously stacked trays intermediate of said base portion and said cover portion having first and last trays thereof and each tray having first and second sides and each tray holding a respective modular layer and having said first side that is proximate said passageway; and a plurality of hinges including a first and last hinge, with each hinge having first and second ends for pivotally interconnecting said contiguously stacked trays and with said base and said cover portions, each of said sides of said trays having said opening having one end of one of said hinges attached thereto, said first hinge pivotally joining said first tray and said base portion and said last hinge pivotally joining said last tray and said cover portion.

2. The network interface unit according to claim 1, wherein at least one of said plurality of modular layers further comprises at least one electrical device and said cabled wiring further comprises wiring for electrically connecting said at least one electrical device to said array of customer bridges within its respective modular layer.

3. The network interface unit according to claim 2, wherein said cabled wiring for said at least one electrical device further comprises wiring for electrically connecting said at least one electrical device to said array of protective devices.

4. The network interface unit according to claim 1, wherein said plurality of trays has a next to last tray and further comprising:

a plurality of sets of screws and screw receptacles dimensioned for complementary mating therebetween and said plurality having a first and a last set, said first set having its receptacle mounted to said base and its screw mounted to said second side of said first tray and said last set having its screw mounted to said second side of said last tray and its receptacle mounted to said second side of said next to last tray.

5. The network interface unit according to claim 1, wherein said cover has first and second sides and further comprising a cover hinge having first and second ends with the first end of the cover hinge being attached to the second side of said last tray and the second end of the cover hinge being attached to the first side of said cover.

6. The network interface unit according to claim 5 further comprising a cover set of a screw and screw receptacle dimensioned for complementary mating therebetween, said cover receptacle mounted to the second side of said last tray and said cover screw mounted to the second side of said cover.

7. The network interface device according to claim 3, wherein said plurality of hinges have movement limits defined by said first and second ends of said hinges and wherein said plurality of trays has opened positions defined by said movement limits of said hinges.

8. A network interface module for servicing a plurality of subscribers and having a base portion and a cover portion with first and second sides and adapted for mounting over a building entrance protector unit, the interface module comprising:

a plurality of modular layers having first and last modular layers thereof and each modular layer including at least an array of customer bridges each adapted for coupling to a different line of a subscriber, each modular layer having a passageway and each array having cabled wiring passing through said passageway;

a plurality of contiguously stacked trays intermediate of said base portion and said cover portion and having first and last trays thereof and each tray having first and second sides and said last tray being mounted to said base, each tray holding a respective modular layer and having said first side that is proximate said passageway; and a plurality of hinges including a hinge with each hinge having first and second ends for interconnecting said contiguously stacked trays and with said base and cover portions, each of said sides of said trays having said passageway having one end of one of said hinges attached thereto, said first hinge pivotally joining said first tray and said base portion and said last hinge pivotally joining said last tray and said cover portion.

9. The network interface unit according to claim 8, wherein at least one of said plurality of modular layers further comprises at least one electrical device and said cabled wiring further comprises wiring for electrically connecting said at least one electrical device to said array of customer bridges within its respective modular layer.

10. The network interface unit according to claim 8, wherein said plurality of trays has a next to last tray and further comprising:

a plurality of sets of screws and screw receptacles dimensioned for complementary mating therebetween and said plurality having a first and a last set, said first set having its receptacle mounted to said base and its screw mounted to said second side of said first tray and said last set having its screw mounted to said second side of said last tray and its receptacle mounted to said second side of said next to last tray.

11. The network interface unit according to claim 8, wherein said cover has first and second sides and further comprising a cover hinge having first and second ends with the first end of the cover hinge being attached to the second side of said last tray and the second end of the cover hinge being attached to the first side of said cover.

12. The network interface unit according to claim 11 further comprising a cover set of a screw and screw receptacle dimensioned for complementary mating therebetween, said cover receptacle mounted to the second side of said last tray and said cover screw mounted to the second side of said cover.

13. The network interface device according to claim 9, wherein said plurality of hinges have movement limits defined by said first and second ends of said hinges and wherein said plurality of trays have opened positions defined by said movement limits of said hinges.

* * * * *